(12) United States Patent
Stump et al.

(10) Patent No.: US 9,845,079 B2
(45) Date of Patent: Dec. 19, 2017

(54) REAR WINDSCREEN WIPER DEVICE

(71) Applicant: Federal-Mogul Motorparts Corporation, Southfield, MI (US)

(72) Inventors: Mark Stump, South Lyon, MI (US); William D. Young, III, Waterford, MI (US)

(73) Assignee: Federal-Mogul Motorparts, Southfield, MI (US)

( * ) Notice: Subject to any disclaimer, the term of this patent is extended or adjusted under 35 U.S.C. 154(b) by 470 days.

(21) Appl. No.: 14/534,820

(22) Filed: Nov. 6, 2014

(65) Prior Publication Data

US 2015/0121643 A1    May 7, 2015

Related U.S. Application Data

(60) Provisional application No. 61/900,628, filed on Nov. 6, 2013.

(51) Int. Cl.
  *B60S 1/38* (2006.01)
  *B60S 1/40* (2006.01)
  *B60S 1/58* (2006.01)

(52) U.S. Cl.
  CPC ............ *B60S 1/583* (2013.01); *B60S 1/386* (2013.01); *B60S 1/3849* (2013.01);
  (Continued)

(58) Field of Classification Search
  CPC .... B60S 1/3853; B60S 1/3858; B60S 1/3851; B60S 1/3849; B60S 1/3855; B60S 1/3867;
  (Continued)

(56) References Cited

U.S. PATENT DOCUMENTS 7,461,429 B2    12/2008   Huang
7,484,264 B2 *   2/2009   Kraemer ................. B60S 1/381
                                               15/250.201
(Continued)

FOREIGN PATENT DOCUMENTS

DE    102006031514 A1    1/2008
DE    102009000762 A1    8/2010
(Continued)

OTHER PUBLICATIONS

International Search Report, dated Feb. 4, 2015 (PCT/US2014/064341).

*Primary Examiner* — Gary Graham
(74) *Attorney, Agent, or Firm* — Robert L. Stearns; Dickinson Wright, PLLC

(57) ABSTRACT

The windscreen wiper device includes a wiper element which is made of a flexible material and a carrier which operably supports the wiper element and biases the wiper element into a pre-curved position. A base is engaged with the carrier and at least one connector piece is releasably connectable with the base. The base includes a pair of holding elements which wrap around opposite lateral side edges of the carrier and a pair of laterally spaced side walls. The connector piece includes a pair of legs. A pair of projections are disposed in at least one of the side walls of the base and the legs of the connector piece and a pair of recesses are disposed on at least one of the side walls of the base and the legs of the connector piece for snappingly receiving the projections to releasably attach the connector piece with the base.

9 Claims, 7 Drawing Sheets

(52) U.S. Cl.
CPC ........... *B60S 1/3851* (2013.01); *B60S 1/3855* (2013.01); *B60S 1/3858* (2013.01); *B60S 1/3867* (2013.01); *B60S 1/4003* (2013.01); *B60S 1/4009* (2013.01); *B60S 1/4064* (2013.01); *B60S 1/3853* (2013.01); *B60S 2001/3813* (2013.01); *B60S 2001/409* (2013.01)

(58) Field of Classification Search
CPC .... B60S 1/4003; B60S 1/4045; B60S 1/4048; B60S 2001/409; B60S 1/387
USPC ...................................................... 15/250.32
See application file for complete search history.

(56) References Cited

U.S. PATENT DOCUMENTS

| | | | |
|---|---|---|---|
| D592,121 S | 5/2009 | Bratec et al. | |
| 7,581,277 B2 * | 9/2009 | Genet | B60S 1/381 15/250.201 |
| 7,644,483 B2 | 1/2010 | Thomar et al. | |
| 7,698,775 B2 | 4/2010 | Lee | |
| 8,020,246 B2 | 9/2011 | Bauer et al. | |
| 8,261,403 B2 | 9/2012 | Ehde | |
| 8,307,494 B2 | 11/2012 | Boland | |
| 8,336,158 B2 | 12/2012 | Stankiewicz et al. | |
| 8,347,449 B2 | 1/2013 | Genet et al. | |
| 8,359,701 B2 | 1/2013 | De Block et al. | |
| 8,370,987 B2 | 2/2013 | Ritt | |
| 8,402,593 B2 | 3/2013 | Boland | |
| 8,402,595 B2 | 3/2013 | Boland | |
| 8,443,483 B2 | 5/2013 | Dallos, Jr. et al. | |
| 2006/0117515 A1 * | 6/2006 | Fink | B60S 1/38 15/250.32 |
| 2006/0191093 A1 * | 8/2006 | Boland | B60S 1/38 15/250.32 |
| 2006/0248675 A1 | 11/2006 | Vacher et al. | |
| 2008/0047090 A1 * | 2/2008 | Ku | B60S 1/3858 15/250.32 |
| 2008/0148509 A1 * | 6/2008 | Bacarella | B60S 1/3806 15/250.32 |
| 2009/0199357 A1 | 8/2009 | Thienard | |
| 2010/0275402 A1 * | 11/2010 | Espinasse | B60S 1/3848 15/250.32 |
| 2010/0275403 A1 * | 11/2010 | Jollec | B60S 1/38 15/250.361 |
| 2011/0225761 A1 | 9/2011 | Kim | |
| 2012/0005855 A1 | 1/2012 | Egner-Walter et al. | |
| 2012/0311809 A1 * | 12/2012 | Camps | B60S 1/3855 15/250.32 |
| 2012/0317741 A1 * | 12/2012 | Benner | B60S 1/3858 15/250.32 |
| 2013/0125332 A1 | 5/2013 | Boland et al. | |
| 2013/0326838 A1 * | 12/2013 | Greunlinx | B60S 1/3855 15/250.48 |
| 2013/0333150 A1 * | 12/2013 | Crabbe | B60S 1/3855 15/250.361 |

FOREIGN PATENT DOCUMENTS

| | | |
|---|---|---|
| DE | 202010017467 U1 | 5/2012 |
| DE | 102011005167 A1 | 9/2012 |
| FR | 2886253 A1 | 12/2006 |
| WO | 2006069648 A1 | 7/2006 |
| WO | 2008076088 A1 | 6/2008 |
| WO | 2010062125 A2 | 6/2010 |

* cited by examiner

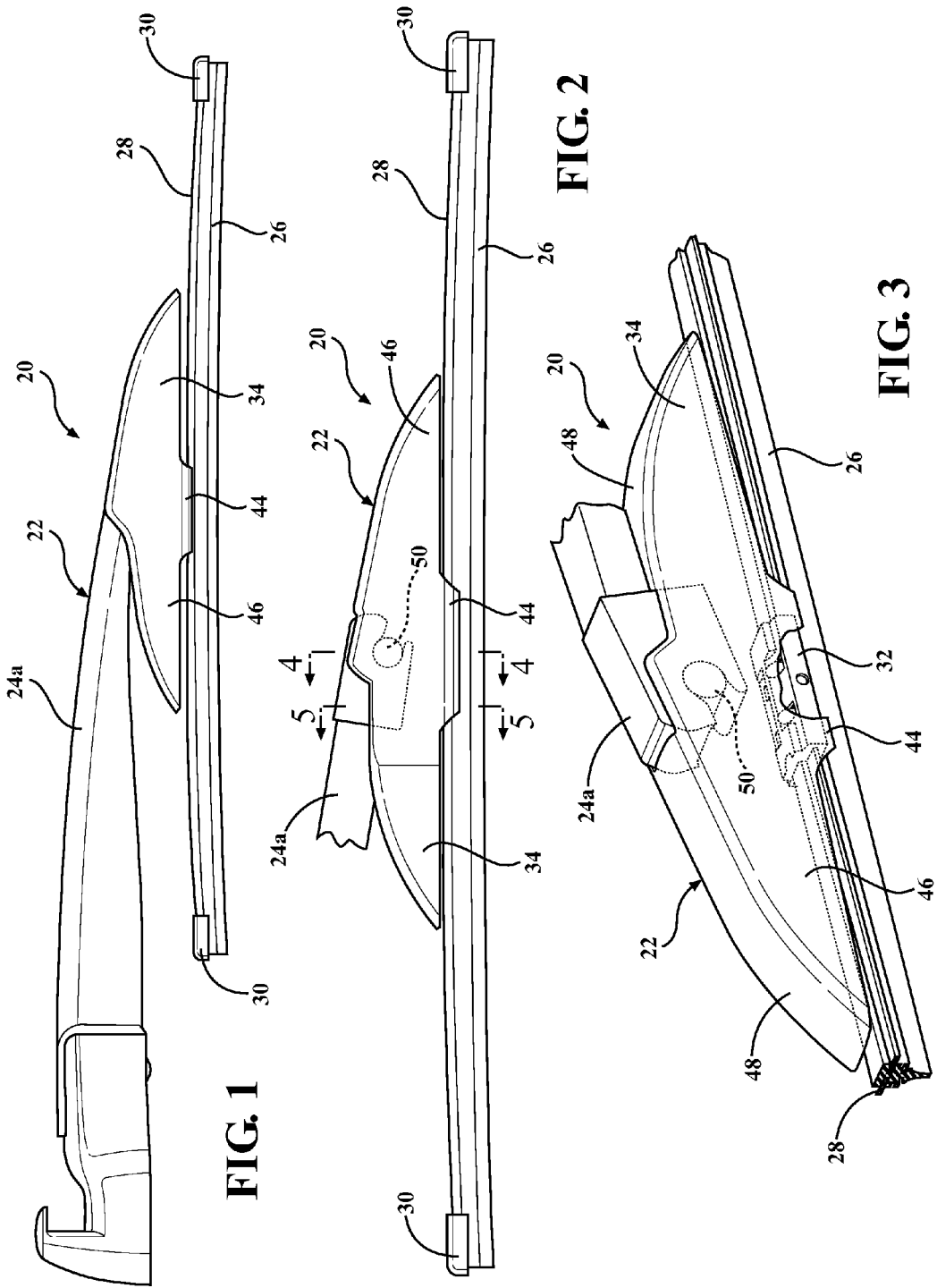

REAR WINDSCREEN WIPER DEVICE

CROSS-REFERENCE TO RELATED APPLICATION

This application claims priority to U.S. Provisional Application No. 61/900,628, filed on Nov. 6, 2013 and entitled "Rear Windshield Windscreen Wiper Device", the entire disclosure of the application being considered part of the disclosure of this application and hereby incorporated by reference.

BACKGROUND OF THE INVENTION

1. Field of the Invention

The present application is related generally to windscreen wiper devices and more particularly to connecting assemblies for joining windscreen wiper devices with rear oscillating wiper arms on vehicles.

2. Related Art

Many passenger vehicles, such as sport utility vehicles, hatchback vehicles and station wagons are provided with an oscillating wiper arm and a wiper blade for cleaning the rear windshield. Such vehicles are provided with any one of a range of different sizes and styles of oscillating wiper arms including. When the original equipment wiper blades become worn, customers typically look to the aftermarket for replacement wiper blades.

Some aftermarket wiper blades are configured only for attachment to one size and style of rear wiper arm. However, customizing parts for each type and length of rear wiper blade can be very costly. Therefore, there is a desire to use the same parts for different lengths of wiper blades and for attachment to different styles of wiper arms in order to achieve cost savings through economies of scale.

SUMMARY OF THE INVENTION AND ADVANTAGES

An improved windscreen wiper device is provided which may be manufactured at a low cost and may be quickly, easily and securely configured for attachment with a range of rear wiper arms.

An aspect of the present invention provides for a windscreen wiper device including a wiper element which is made of a flexible material. A carrier operably supports the wiper element and biases the wiper element into a pre-curved position. A connecting device is provided for attachment with a rear wiper arm. The connecting device includes a base which is engaged with the carrier and at least one connector piece which is releasably connectable with the base. The base includes a pair of holding elements which wrap around opposite lateral side edges of the carrier and a pair of laterally spaced side walls. The connector piece including a pair of laterally spaced legs. A pair of projections are disposed in at least one of the side walls of the base and the legs of the connector piece and a pair of recesses are disposed on at least one of the side walls of the base and the legs of the connector piece for receiving the projections to attach the connector piece with the base.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a front elevation view showing an exemplary windscreen wiper device attached with a Type A style rear wiper arm;

FIG. 2 is another front elevation view showing the exemplary windscreen wiper device attached with the Type A style rear wiper arm;

FIG. 3 is a fragmentary and isometric view showing the exemplary windscreen wiper device attached with the Type A style rear wiper arm;

DETAILED DESCRIPTION OF THE ENABLING EMBODIMENT

Figure 19:
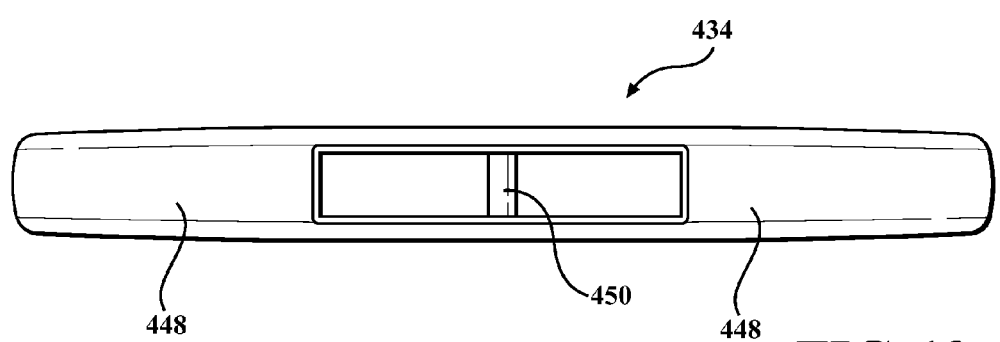
FIG. 19 is a top elevation view of the connector piece of FIG. 18.

Referring to the Figures, wherein like numerals indicate corresponding parts throughout the several views, a first exemplary embodiment of an improved beam-style windscreen wiper device 20, or wiper blade assembly, for cleaning a rear windscreen (not shown) of a vehicle (not shown) is generally shown in FIGS. 1 and 2. The wiper device 20 includes a connecting device 22 with easily interchangeable parts which may be readily and easily configured for attachment to a range of different styles of rear wiper arms 24. Specifically, without the need for any special tools, a user may be quickly configure the connecting device 22 for attachment with "Type A" rear wiper arms 24a (FIGS. 1-5), "Type B" rear wiper arms 24b (FIG. 11), "Type D" rear wiper arms 24c (FIG. 14), "Type E" rear wiper arms (not shown) or hook style rear wiper arms 24d (FIG. 19).

Figure 4:
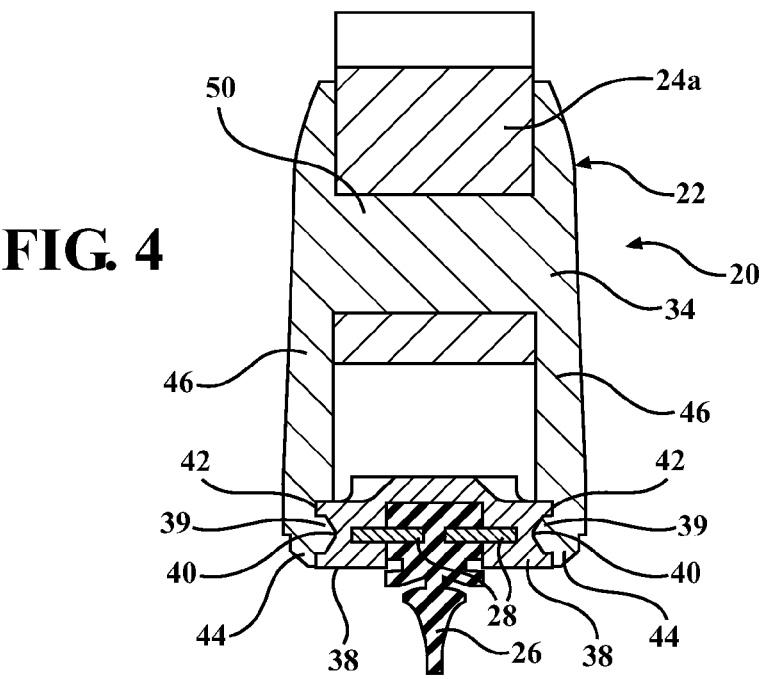
FIG. 4 is a cross-sectional view of the windscreen wiper device taken along line 4-4 of FIG. 2.
Figure 5:
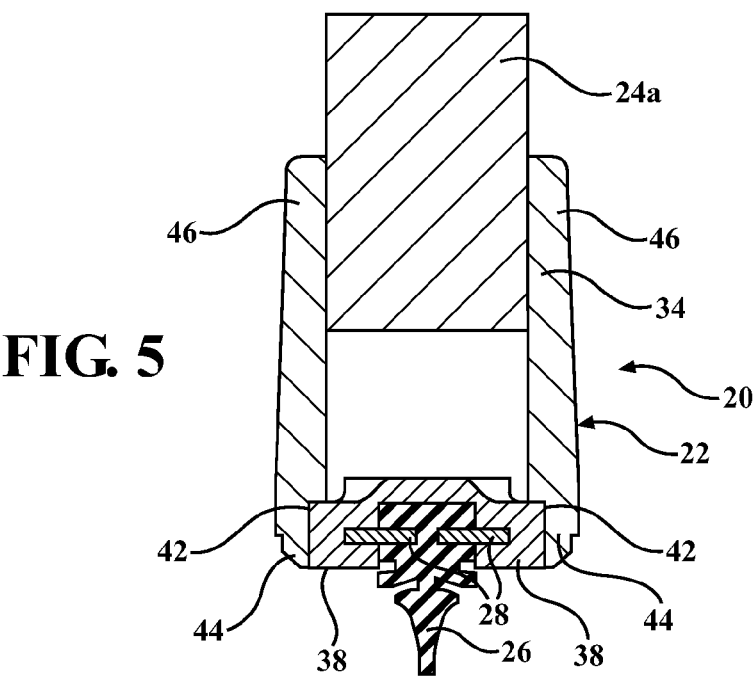
FIG. 5 is a cross-sectional view of the windscreen wiper device taken along line 5-5 of FIG. 2.

The wiper device 20 includes a wiper element 26 which is made of a flexible, elastic material (such as rubber) for sealing against the rear windshield to clear water, ice and other debris therefrom. The wiper device 20 is a beam-style device in that it has a longitudinally extending carrier which operably supports and biases the wiper element 26 into a pre-curved configuration to seal the length of the wiper element 26 against the windshield. This is in contrast to so-called conventional-style wiper devices which employ a superstructure which includes a plurality of yokes to bias the length of the wiper element against the windshield. As best shown in FIGS. 4 and 5, the wiper element 26 has a pair of laterally oppositely facing and longitudinally extending grooves, and the carrier includes a pair of longitudinal strips (also known as flexors 28), which are disposed in the grooves and project laterally outside of the grooves. Referring back to FIGS. 1 and 2, neighboring ends of the flexors 28 are interconnected with one another with end caps 30.

A connecting device 22 is engaged with the flexors 28 of the carrier at approximate longitudinal midpoints of the flexors 28 for attachment with a rear wiper arm 24. As shown in FIG. 3, the connecting device 22 is of multiple pieces including a base 32 and a connector piece 34. The base 32 is permanently fixed or engaged with the flexors 28 in a factory setting, and the connector piece 34 is releasably engagable with the connector piece 34 for either directly engaging the rear wiper arm 24 or for receiving a separate adapter 36 (shown in FIG. 18) which in turn engages the rear wiper arm 24. The base 32 and the connector piece 34 are each preferably formed of a polymeric material and through an injection molding process. The wiper device 20 is preferably packaged with two or more connector pieces 34, 134, 234, 334, 434 with similar means of engaging the base 32 for connecting with different styles and sizes of rear wiper arms 24a, 24b, 24c, 24d.

Figure 6:
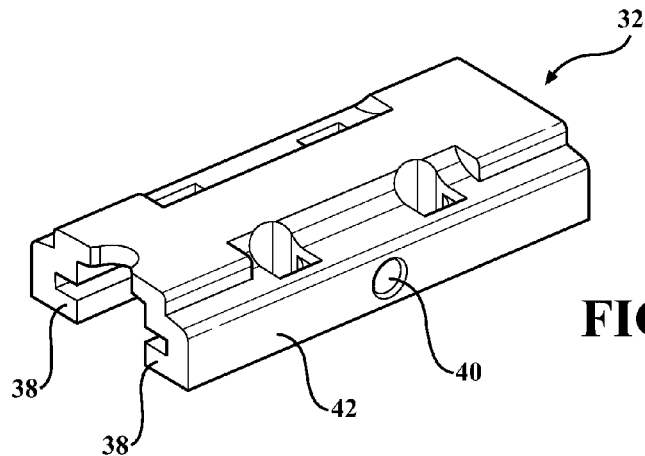
FIG. 6 is an isometric view of a base of the windscreen wiper device of FIG. 1.
Figure 7:
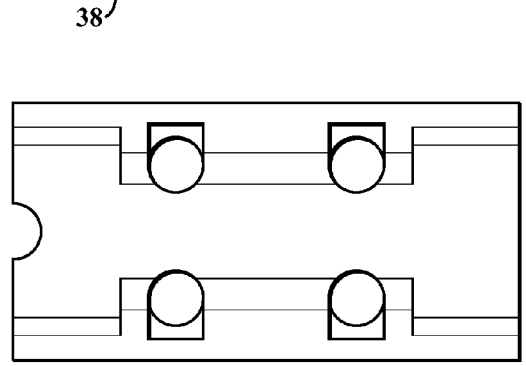
FIG. 7 is a top view of the base of FIG. 6.
Figure 8:
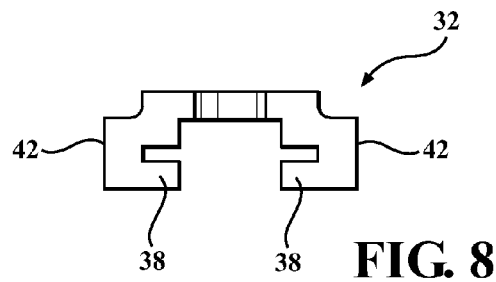
FIG. 8 is a side view of the base of FIG. 6.
Figure 9:
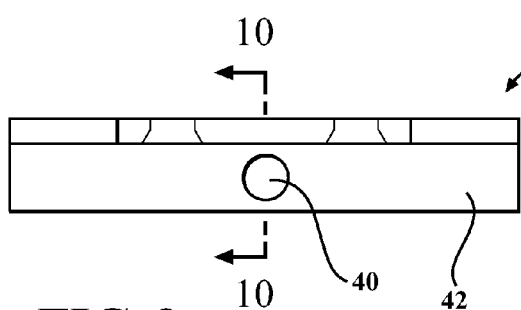
FIG. 9 is a front view of the base of FIG. 6.
Figure 10:
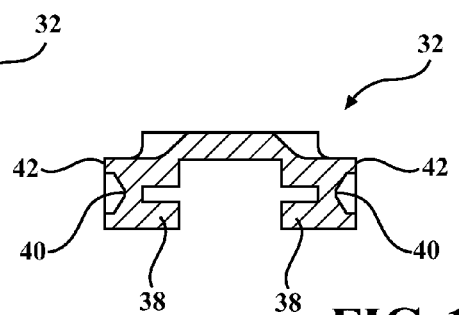
FIG. 10 is a cross-sectional view of the base taken along line 10-10 of FIG. 9.

Referring now to FIG. 4-6, the base 32 includes a pair of generally L-shaped holding elements 38 for wrapping around opposite lateral edges of the flexors 28 to hold the base 32 piece in engagement with the flexors 28 of the carrier. Preferably, during manufacturing of the windscreen wiper device 20, the holding elements 38 of the base 32 are slid into a predetermined longitudinal position on the flexors 28. Next, the base 32 is heat staked or ultrasonically welded into engagement with the flexors 28 by melting the plastic materials of the base 32 and a coating on the flexors 28 together and allowing the molten material to cool, thereby establishing a permanent connection between the base 32 and the flexors 28. However, any suitable joining means could be employed to join the base 32 with the carrier.

Preferably, the windscreen wiper device 20 is packaged with a plurality of connector pieces 34, 134, 234, 334, 434 which are configured for attachment to different styles of wiper arms 24a, 24b, 24c, 24d, and all of the connector pieces 34, 134, 234, 334, 434 are configured for attachment with the base 32 in a similar manner. With reference to the first exemplary embodiment of the connector piece 34 shown in FIGS. 1-5, the base 32 and the connector piece 34 are releasably connectable with one another by snap fitting a pair of projections 39 on either the connector piece 34 or the base 32 into a pair of recesses 40 in the other. Specifically, in the exemplary embodiment, the base 32 includes a pair of side walls 42 which are spaced laterally from one another and face in opposite lateral directions. Each of the side walls 42 includes a single dimple, or a recess 40, which is located at approximately a longitudinal midpoint of the base 32. The connector piece 34 has a pair of legs 44 which extend vertically downwardly and each of which has a projection that is shaped similarly to the recesses 40 in the base 32. The legs 44 are resiliently deflectable for deflecting outwardly to allow for a snap fitting engagement between the projections 39 on the legs 44 of the connector piece 34 and the recesses 40 in the side walls 42 of the base 32.

Referring still to FIGS. 1-5, to attach a connector piece 34 with the base 32, a user simply urges the connector piece 34 downwardly such that the legs 44 of the connector piece 34 resiliently deflect outwardly on either side of the base 32 until the projections snap into the recesses 40. This provides a sufficiently secure connection for rear windscreen wiper devices 20. This process is very simple and requires no special tools. The connector piece 34 may then be detached from the base 32 by pulling the connector piece 34 upwardly to disengage the projections from the recesses 40. As such, the same wiper element 26, flexors 28, end caps 30 and base 32 can be used for connection with a range of different styles of rear oscillating arms. This provides for significant manufacturing cost savings through economies of scale.

With reference still to the first exemplary connector piece 34, each of the exemplary connector pieces 34 includes a pair of lateral walls 46 which are spaced laterally from one another and a top wall 48 which extends transversely between the lateral walls 46. The top wall 48 has an opening formed therein for allowing the passage of a wiper arm 24 therethrough into an interior between the lateral walls 46. A pin 50 is positioned beneath the opening of the top wall 48 and extends transversely between the lateral walls 46 for directly or indirectly engaging with an end of a rear wiper arm 24.

Figure 11:
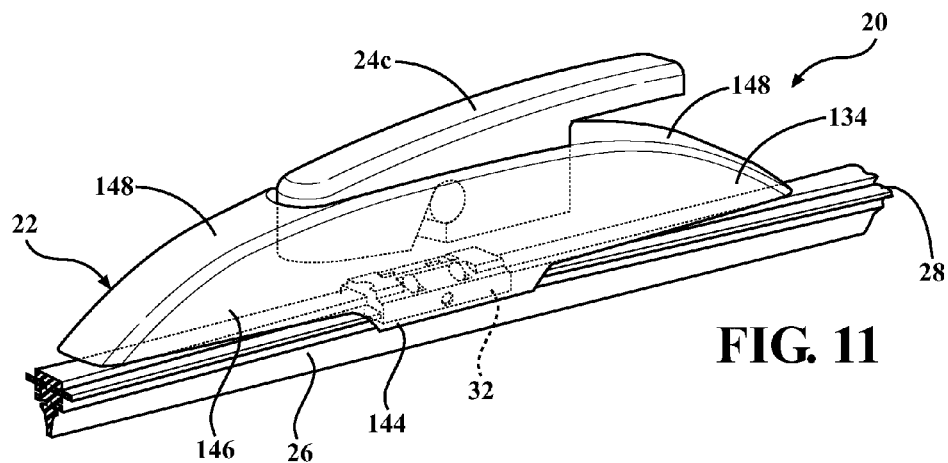
FIG. 11 is a fragmentary and isometric view of the windscreen wiper device with a second exemplary embodiment of a connector piece and in engagement with a Type B style rear wiper arm.
Figure 12:
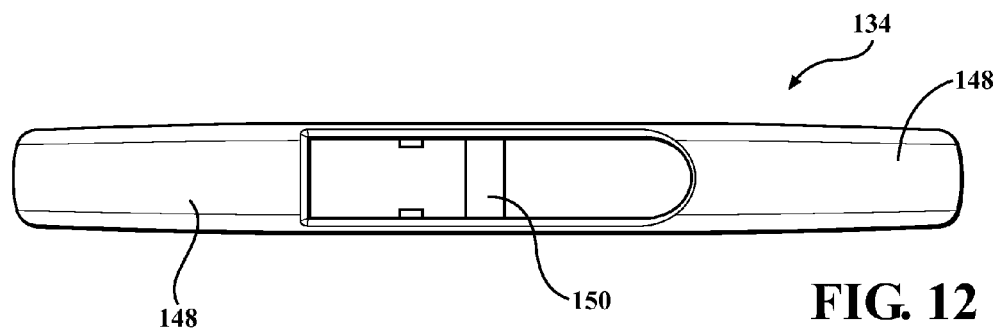
FIG. 12 is a top elevation view of the connector piece of FIG. 11.
Figure 13:
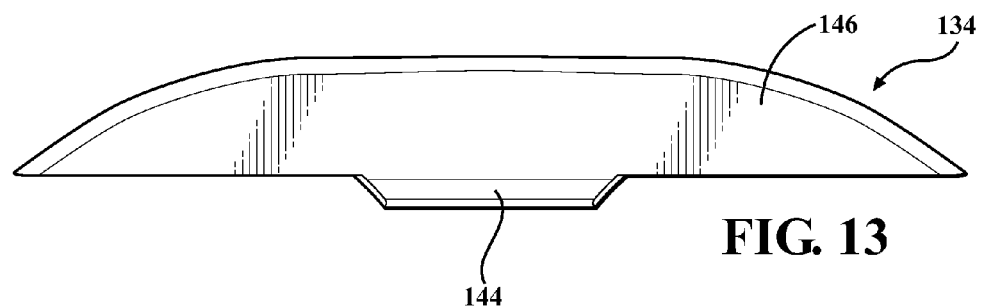
FIG. 13 is a front elevation view of the connector piece of FIG. 11.
Figure 14:
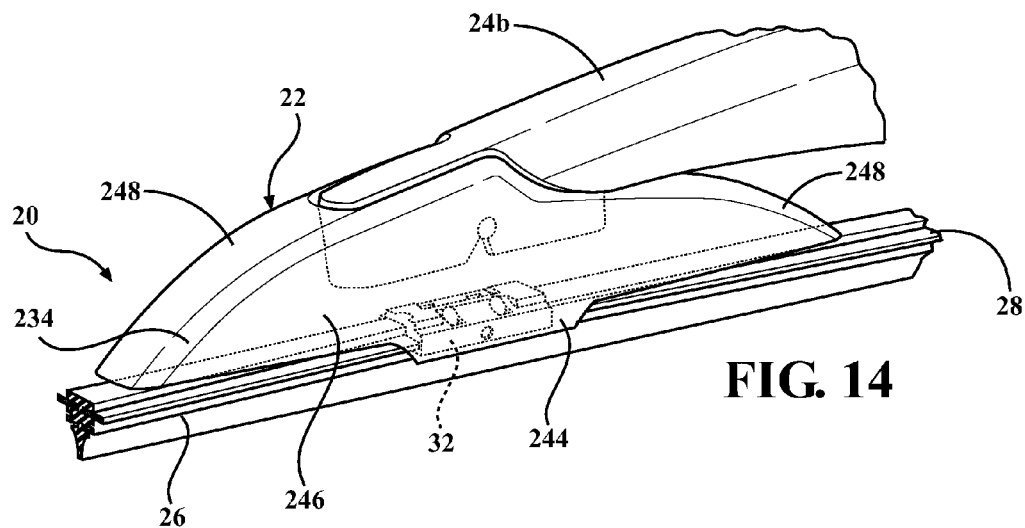
FIG. 14 is a fragmentary and isometric view of the windscreen wiper device with a third exemplary embodiment of the connector piece and in engagement with a Type D style rear wiper arm.
Figure 15:
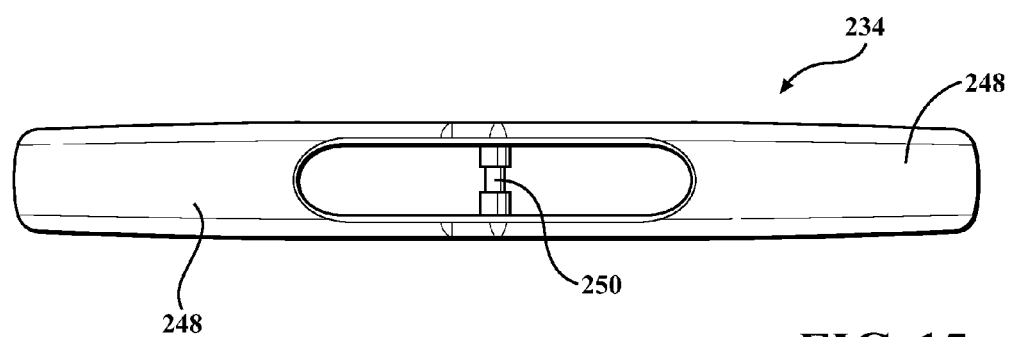
FIG. 15 is a top elevation view of the connector piece of FIG. 14.
Figure 16:
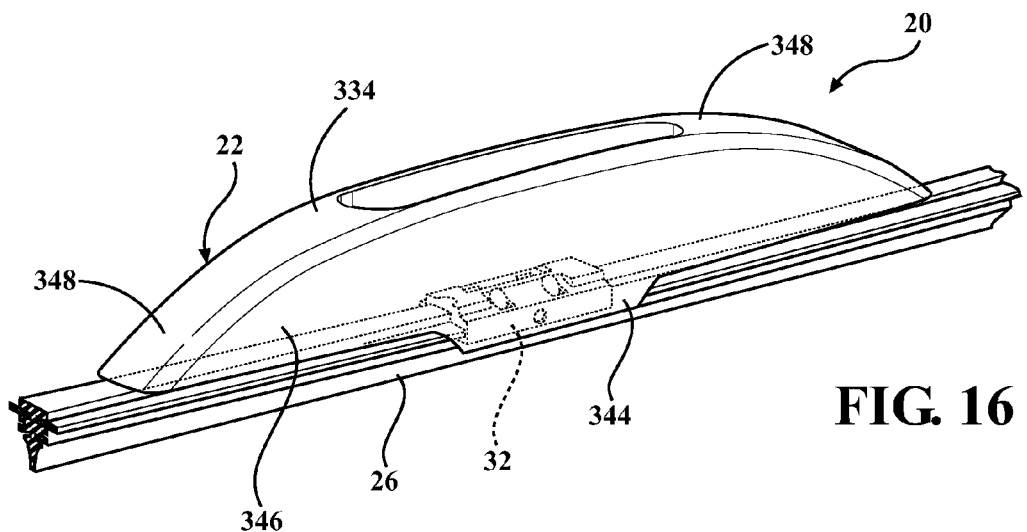
FIG. 16 is a fragmentary and isometric view of the windscreen wiper device with a fourth exemplary embodiment of the connector piece.
Figure 17:
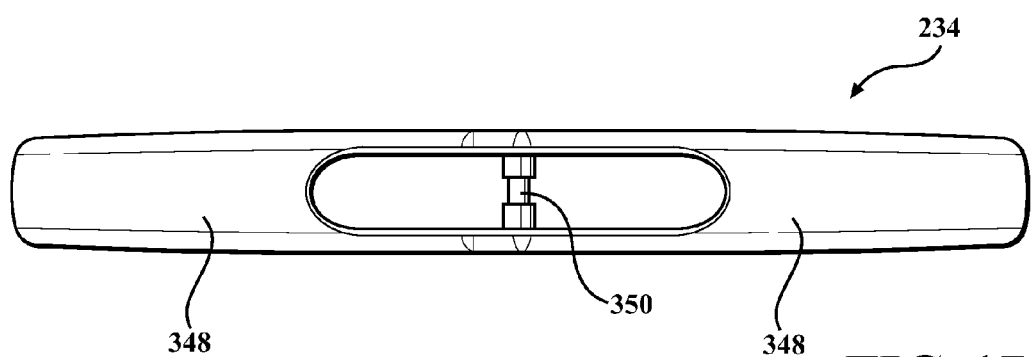
FIG. 17 is a top elevation view of the connector piece of FIG. 16.

The pin 50 of the first exemplary embodiment of the connector piece 34 shown in FIGS. 1-5 is sized and positioned for attachment with Type A style rear wiper arms 24a. Referring now to FIG. 11-13, wherein like numerals separated by a factor of 100 indicate corresponding parts with the first exemplary embodiment, the pin 150 of the second exemplary connector piece 134 is sized and positioned for attachment with Type B style rear wiper arms 24b. Referring now to FIGS. 14 and 15, wherein like numerals separated by a factor of 200 indicate corresponding parts with the first exemplary embodiment, the pin 250 of the third exemplary connector piece 234 is sized and positioned for attachment with Type D style rear wiper arms 24c. Referring now to FIGS. 16 and 17, wherein like numerals separated by a factor of 300 indicate corresponding parts with the first exemplary embodiment, the pin 350 of the fourth exemplary connector piece 334 is sized and positioned for attachment with Type E style rear wiper arms (not shown).

Figure 18:
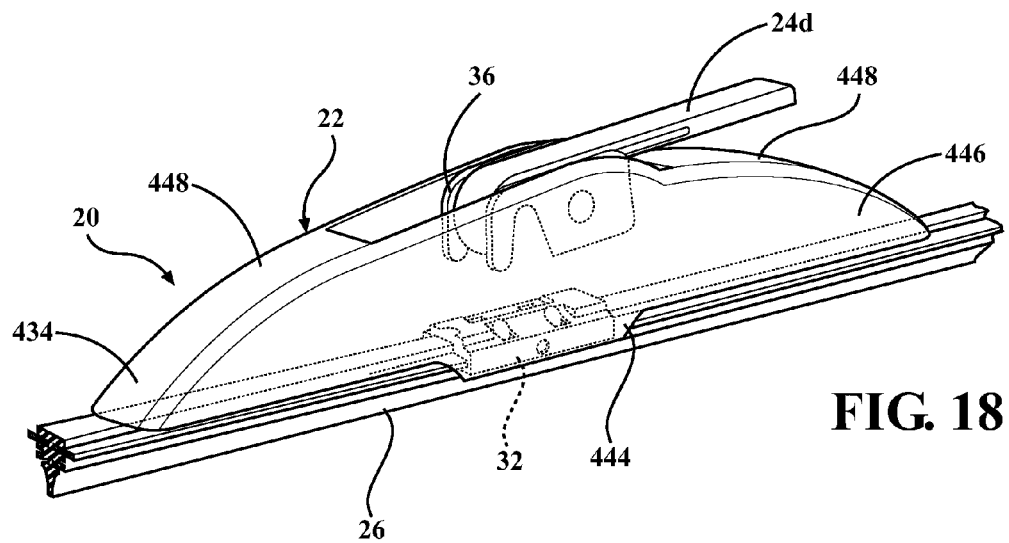
FIG. 18 is a fragmentary and isometric view of the windscreen wiper device with a fifth exemplary embodiment of the connector piece and in engagement with a hook style rear wiper arm.

Referring now to FIGS. 18 and 19, wherein like numerals separated by a factor of 400 indicate corresponding parts with the first exemplary embodiment, an connector piece 434 pivotally engages the pin 450 for receiving a hook style rear wiper arm 24d. The adapter 36 is made as a separate piece from the connector piece 434 and is preferably made of a plastic material through an injection molding process.

Obviously, many modifications and variations of the present invention are possible in light of the above teachings and may be practiced otherwise than as specifically described while within the scope of the appended claims.

What is claimed is:

1. A windscreen wiper device, comprising:
 a wiper element made of a flexible material;
 a carrier operably supporting said wiper element and biasing said wiper element into a pre-curved position;
 a connecting device for attachment with a wiper arm;

said connecting device including a base which is engaged with said carrier and at least one connector piece which is releasably connectable with said base;

said base including a pair of holding elements which wrap around opposite lateral side edges of said carrier and a pair of laterally spaced side walls;

said connector piece including a pair of laterally spaced legs; and a pair of projections formed on said legs of said connector piece and a pair of blind holes disposed on said side walls of said base and wherein said blind holes are shaped similarly to said projections for receiving said projections to attach said connector piece with said base and wherein said blind holes are vertically aligned with said carrier.

2. The windscreen wiper device as set forth in claim 1 further including a plurality of said connector pieces for attachment with different styles of wiper arms.

3. The windscreen wiper device as set forth in claim 1 wherein said at least one connector piece includes a pair of lateral walls which are spaced laterally from one another and includes a pin which extends transversely between said lateral walls for receiving a portion of a wiper arm.

4. The windscreen wiper device as set forth in claim 3 wherein said at least one connector piece further includes a top wall which extends laterally between said lateral walls and presents an opening for the passage of the wiper arm.

5. The windscreen wiper device as set forth in claim 3 wherein said pin includes a groove formed therein.

6. The windscreen wiper device as set forth in claim 1 wherein said base is heat staked into engagement with said carrier.

7. The windscreen wiper device as set forth in claim 1 wherein said carrier includes a pair of longitudinally extending flexors.

8. The windscreen wiper device as set forth in claim 7 wherein neighboring ends of said flexors are interconnected with one another via end caps.

9. The windscreen wiper device as set forth in claim 1 wherein said projections are snappingly engageable within said recesses.

* * * * *